United States Patent [19]

Burns et al.

[11] Patent Number: 4,922,696
[45] Date of Patent: May 8, 1990

[54] GRASS COLLECTING/UTILITY CART FOR RIDING LAWN MOWER

[75] Inventors: Stephen R. Burns, Duluth; Timothy J. Boesch, Roswell; Matthew D. Rao, Alpharetta; Stuart A. Cook, Norcross, all of Ga.; Jack M. Curtis, Santa Fe; Jack M. Boone, Brentwood, both of Tenn.

[73] Assignee: The Murray Ohio Manufacturing Company, Brentwood, Tenn.

[21] Appl. No.: 298,974

[22] Filed: Jan. 19, 1989

[51] Int. Cl.$^5$ ............................................. A01D 34/70
[52] U.S. Cl. ........................................ 56/202; 56/203; 56/205; 298/6; 298/10
[58] Field of Search ................. 56/202, 203, 204, 205, 56/16.6, 320.2; 298/6, 10, 23 R, 26; 280/460.1

[56] References Cited

U.S. PATENT DOCUMENTS

| | | | |
|---|---|---|---|
| 3,678,665 | 7/1972 | Stanke | 56/205 |
| 3,903,565 | 9/1975 | Hicks | 56/320.2 |
| 3,934,392 | 1/1976 | Moery et al. | 56/202 |
| 4,095,398 | 6/1978 | Aumann et al. | 56/202 |
| 4,158,279 | 6/1979 | Jackson | 56/202 |
| 4,476,668 | 10/1984 | Reilly | 56/202 |
| 4,664,403 | 5/1987 | Livingston | 280/460.1 |
| 4,699,393 | 10/1987 | Schweigert | 56/203 |
| 4,787,197 | 11/1988 | Schweigert | 56/202 |
| 4,802,709 | 2/1989 | Jones | 298/6 |

FOREIGN PATENT DOCUMENTS 0254657 1/1988 European Pat. Off. ............. 56/202

OTHER PUBLICATIONS

Drines Corp., Deines 1850-T Advertisement, Jan. 1987.

Primary Examiner—Bruce M. Kisliuk
Attorney, Agent, or Firm—Cushman, Darby & Cushman

[57] ABSTRACT

An improved cart to be towed behind a riding lawn mower for collecting grass clippings, etc. therefrom and also which can be used for strict utility purposes. The cart has a tub-like open-top bed to which is secured a forward upward-extending wall having attached thereto a retractable canopy engagable with the rim of the bed to cover the same and which wall and canopy are readily detachable from the bed. The bed is pivotally mounted on a wheeled chassis for backward tilting for dumping its contents and return to normal position under the control of the operator of the mower while seated on the mower seat. The cart has a pair of ground engaging castor wheels and is detachably hitched to the mower by a construction which permits limited pivotal movement relative to the mower about a horizontal transverse axis and limited pivotal movement about a horizontal axis extending in the fore and aft direction but which prevents pivotal movement about a vertical axis.

27 Claims, 14 Drawing Sheets

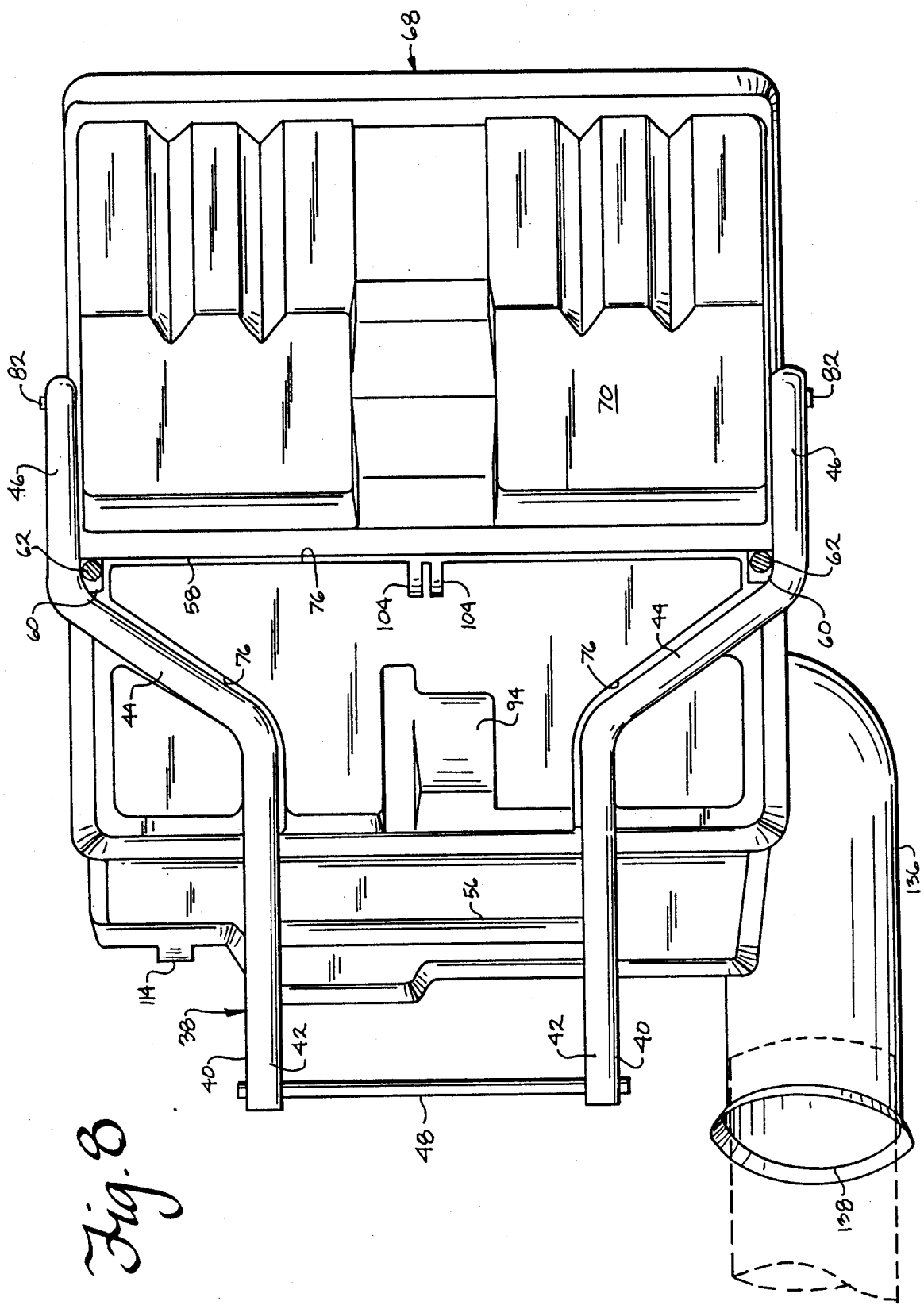

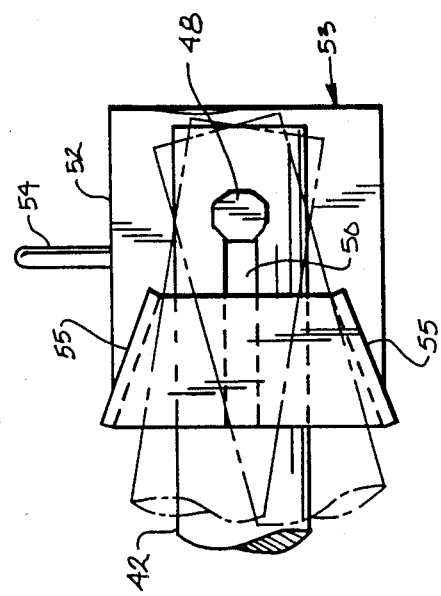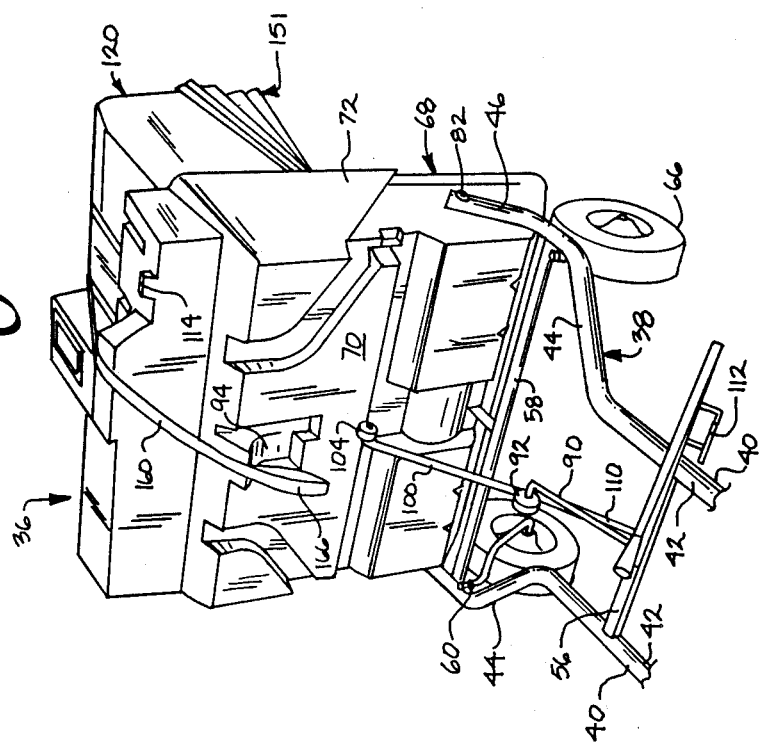

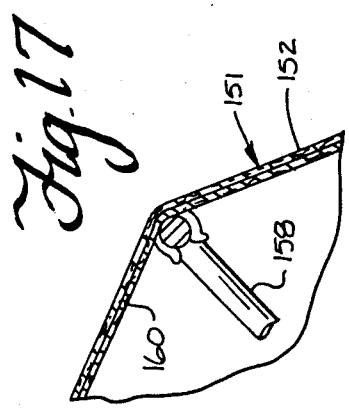
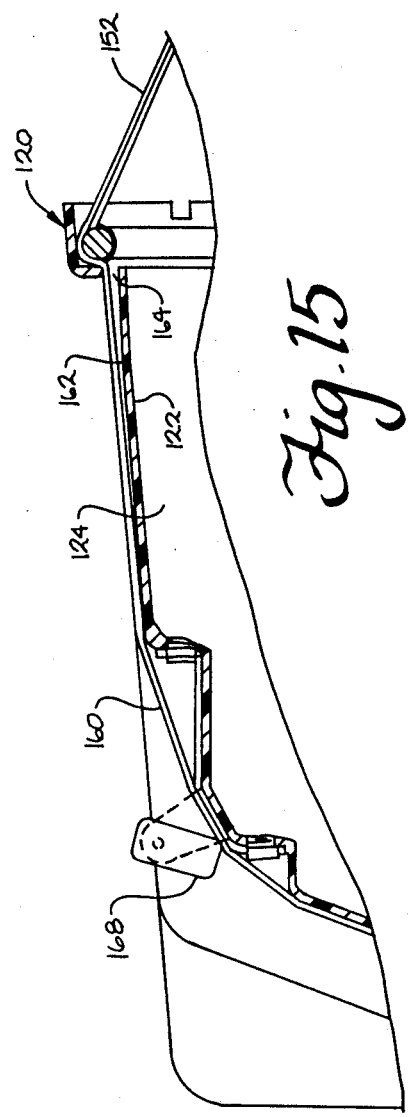
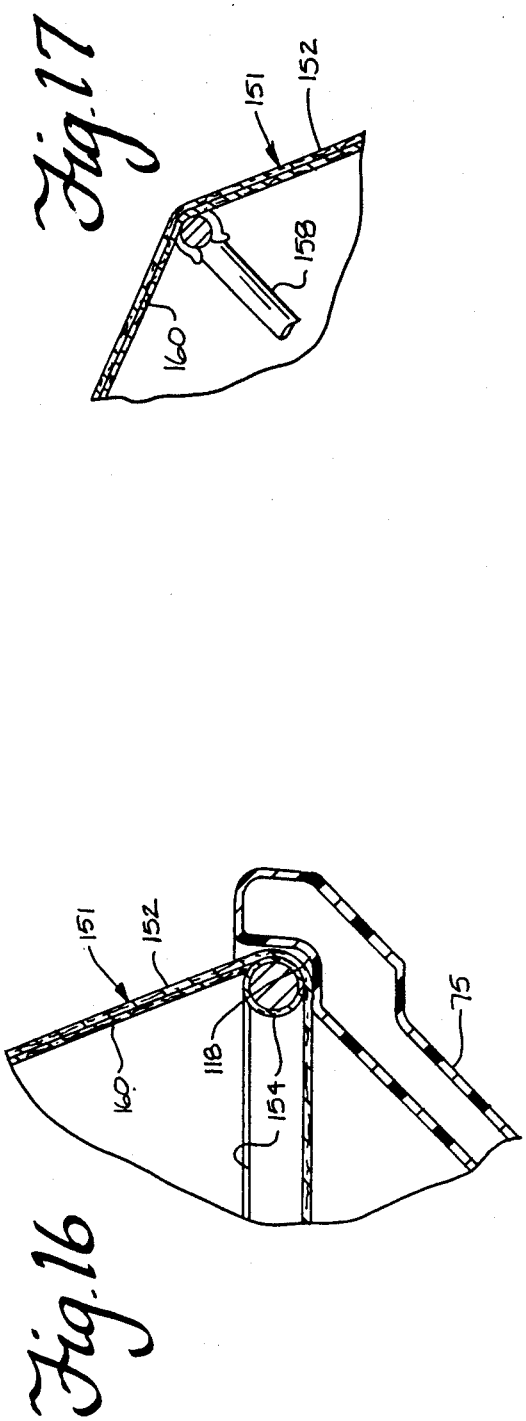

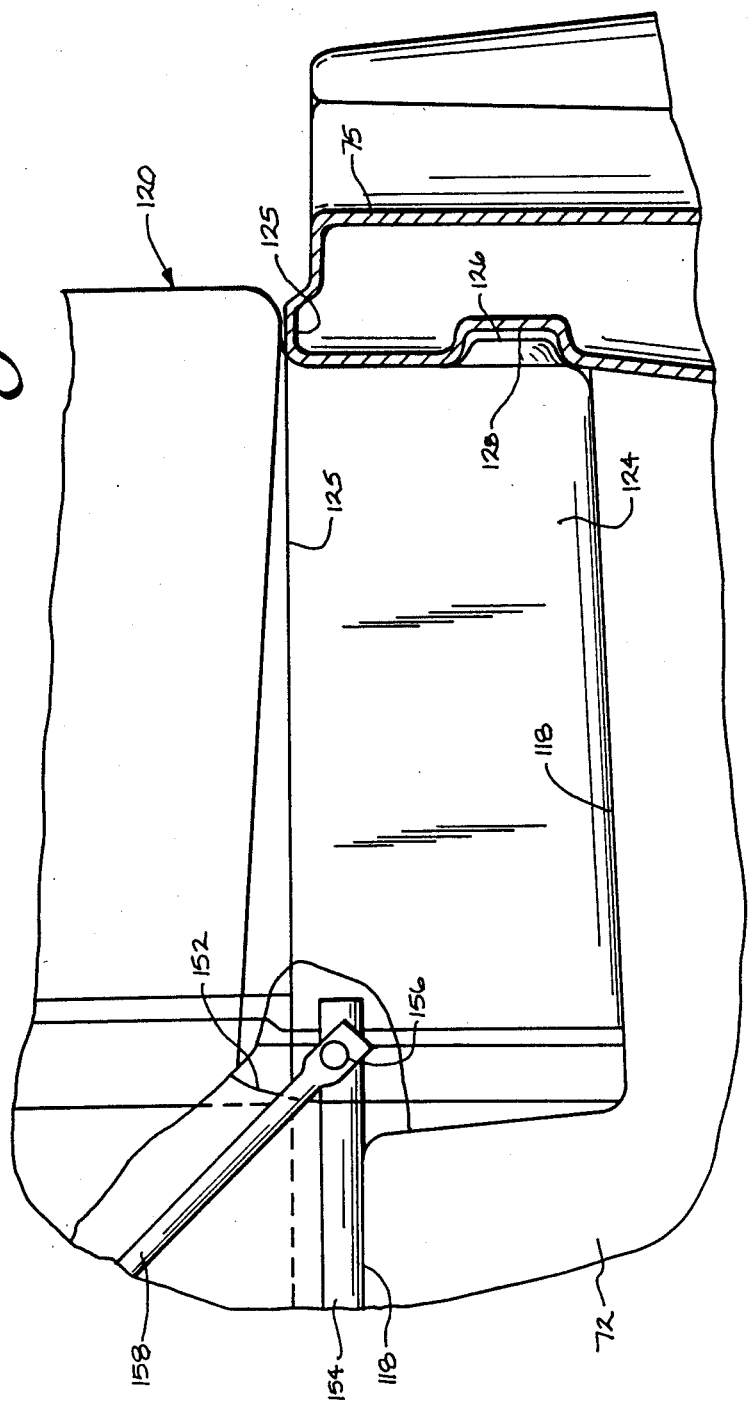

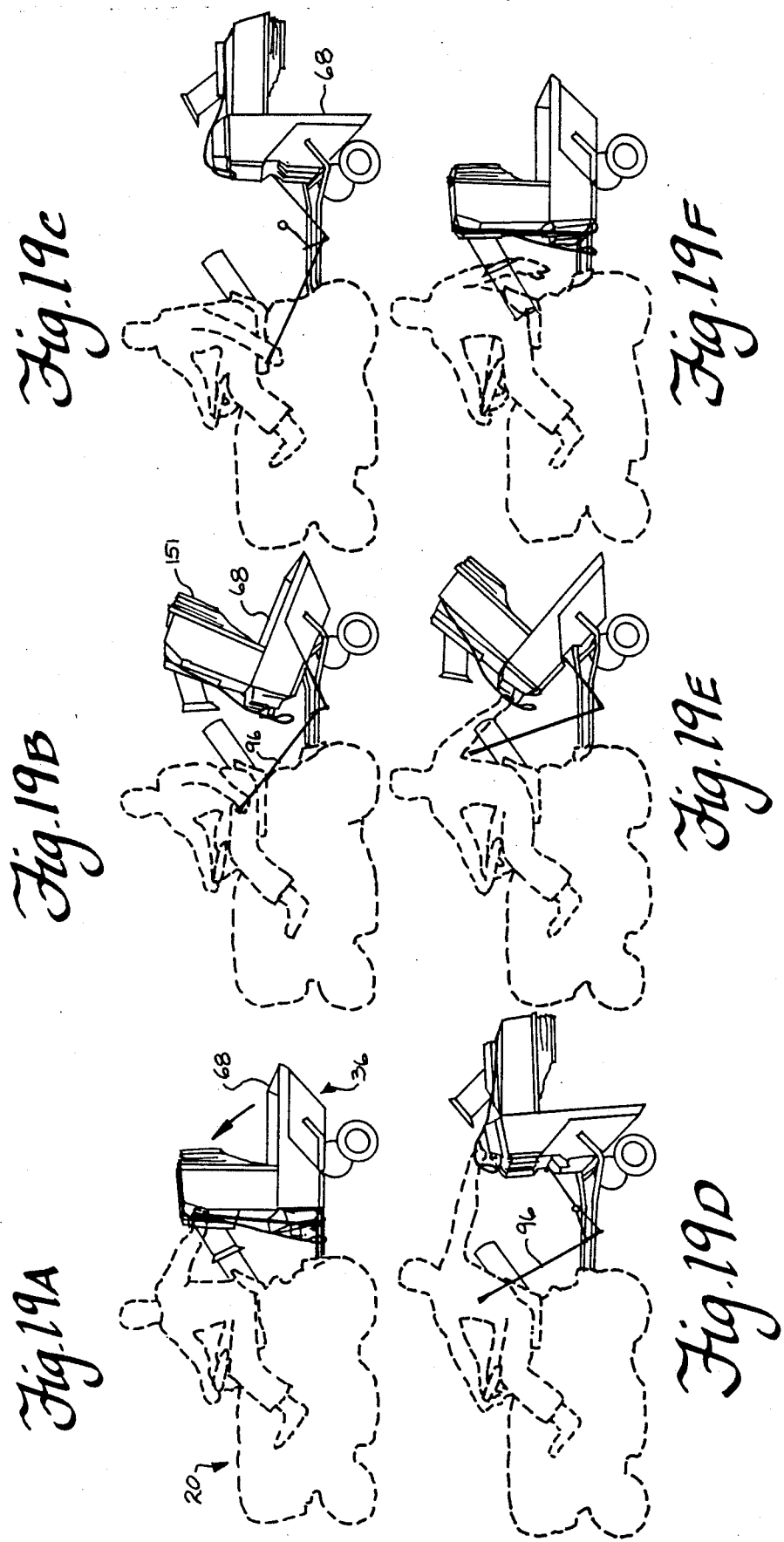

GRASS COLLECTING/UTILITY CART FOR RIDING LAWN MOWER

This invention relates to riding lawn mowers having a towed cart which can be used for receiving and collecting grass clippings, leaves and other debris discharged by the mower as well as used for utility purposes. The invention relates especially to improvements in the towed cart which enable the operation of dumping the cart to be controlled by the operator while seated on the mower's seat. Carts of this type are known generally and an example thereof is disclosed in U.S. Pat. No. 4,158,279. Most known carts of this type, however, are rather complicated in the structural details for conducting material discharged by the mower through a chute to the cart and for tilting the cart rearward for a dumping operation, i.e. to discharge the collected material through the rear of the cart. Frequently the structural details are such as to require the operator to leave his seat on the mower to effect the dumping operation and to return the cart to its usual loading position. Still further, most conventional carts are relatively expensive to manufacture and the arrangement for hitching the cart to the mower is such as to encourage a "fish-tailing" while backing up the mower-cart combination.

SUMMARY OF THE INVENTION

Accordingly, it is an object of this invention to provide an improved cart of the aforedescribed type which permits the operation of dumping and return to a loading position to be controlled by the operator while seated on the mower seat.

It is another object of this invention to provide an arrangement for hitching a cart of the aforedescribed type to a mower which permits backing and turning of the mower-cart combination without fish-tailing.

It is another object of this invention to provide a cart of the aforedescribed type with a wheeled frame or chassis to which is pivotally mounted a dumpable bed and wherein the dumping operation is effected by manually-controlled backward tilting of the bed to a position wherein the bed will become overbalanced and moved to its further inclined dumping position by gravity but wherein such gravity movement is damped to prevent sudden abrupt damaging movements.

It is another object of this invention to provide a cart of the aforedescribed type which has a tub-like open-topped bed to which is detachably secured a forward upward-extending wall having attached thereto a canopy engaging the rim of the bed to cover the same and which wall and canopy are readily detachable from the bed to enable the cart to be used for utility purposes, i.e. for other lawn and garden maintenance activities.

It is another object of this invention to provide such cart with a one-piece tub-like bed made of light weight, corrosion-resistant, yet strong material which is of improved appearance and reduces friction and noise during dumping operation.

Another object of this invention is to provide a cart of the aforedescribed type of simplified construction with consequent ease of operation and cost-savings in its manufacture.

Other objects and advantages of the invention will become apparent from the following description and accompanying drawings in which:

BRIEF DESCRIPTION OF THE DRAWINGS

FIG. 8 is a bottom view of the cart shown in FIG. 1 with the wheels and tilting controls being omitted;

FIG. 9 is a perspective view of the cart shown in FIG. 3 in its dumping position;

FIG. 11 is a fragmentary right side view of the cart-mower hitch;

FIG. 15 is an enlarged fragmentary sectional view taken substantially along line 15—15 of FIG. 5;

FIG. 16 is an enlarged fragmentary sectional view taken substantially along line 16—16 of FIG. 5;

FIG. 17 is an enlarged fragmentary sectional view taken substantially along line 17—17 of FIG. 5;

FIG. 18 is an enlarged fragmentary view partly in section showing the fitting of the detachable wall to the bed of the cart;

FIGS. 19A–19F are somewhat diagrammatic views sequentially showing the operation of dumping the cart.

DETAILED DESCRIPTION OF THE PREFERRED EMBODIMENT

Figure 1:
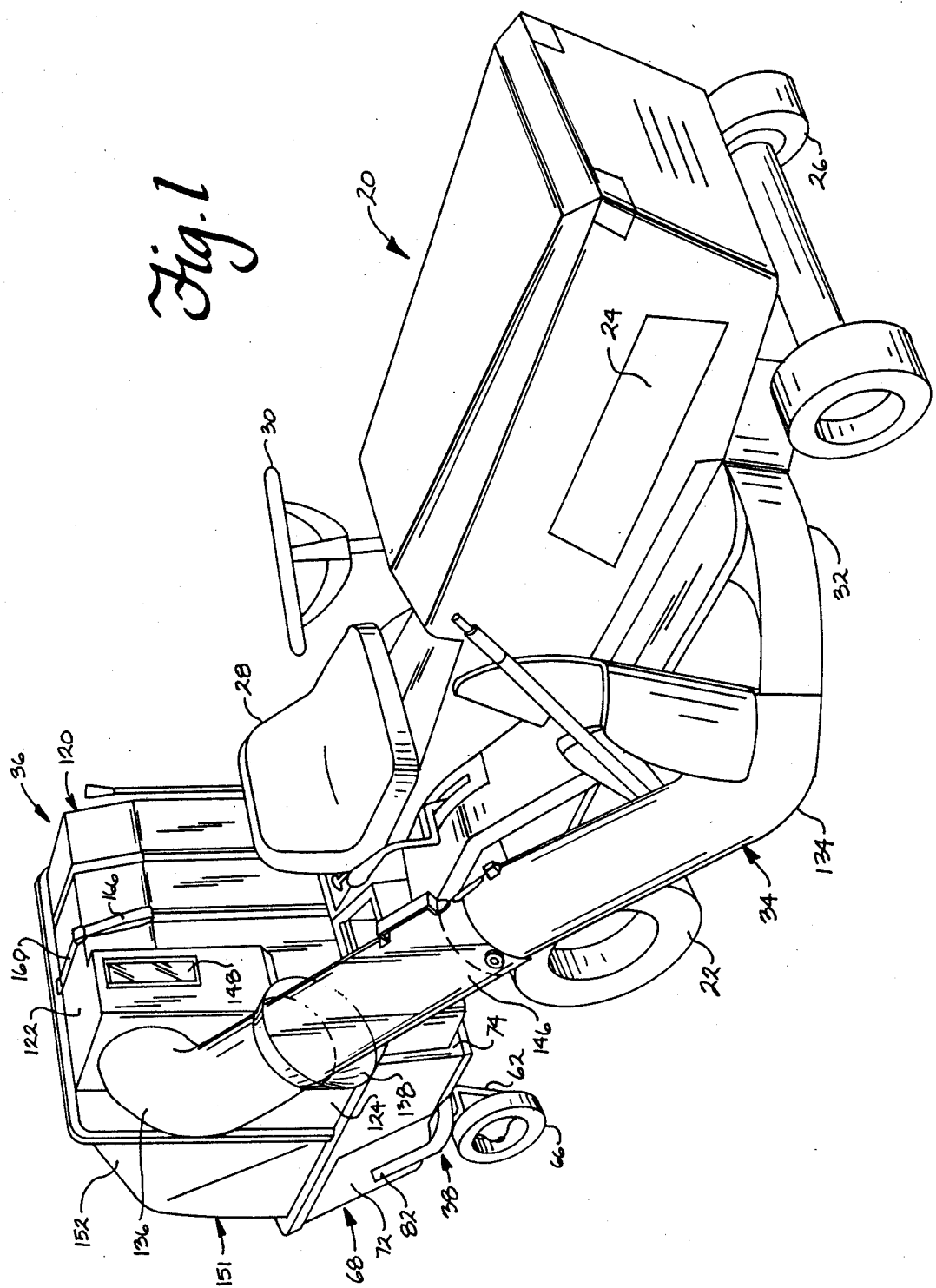
FIG. 1 is a perspective view showing the cart embodying this invention hitched to a riding lawn mower.
Figure 2:
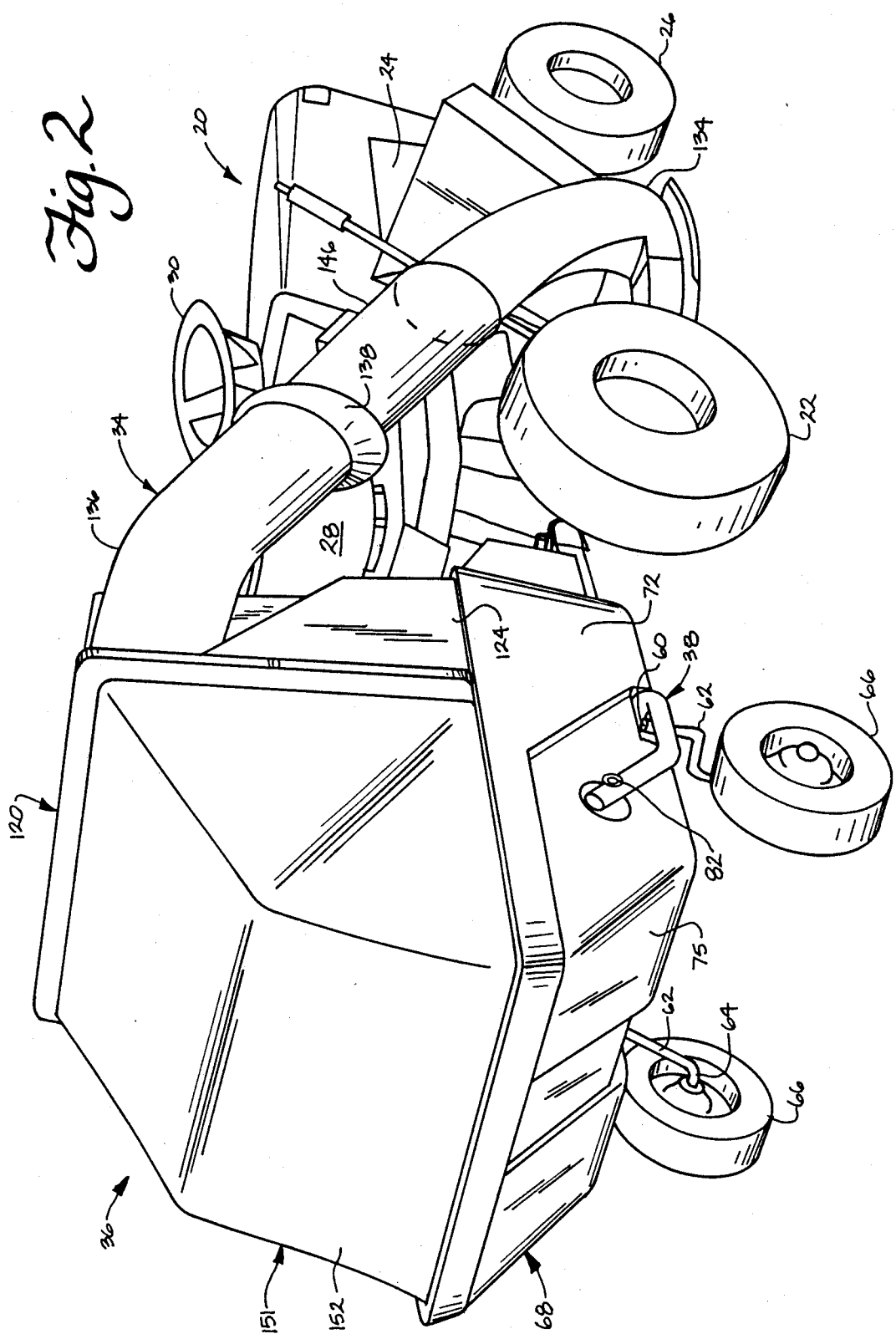
FIG. 2 is a perspective view of the cart and mower shown in FIG. 1 taken from a different angle.
Figure 3:
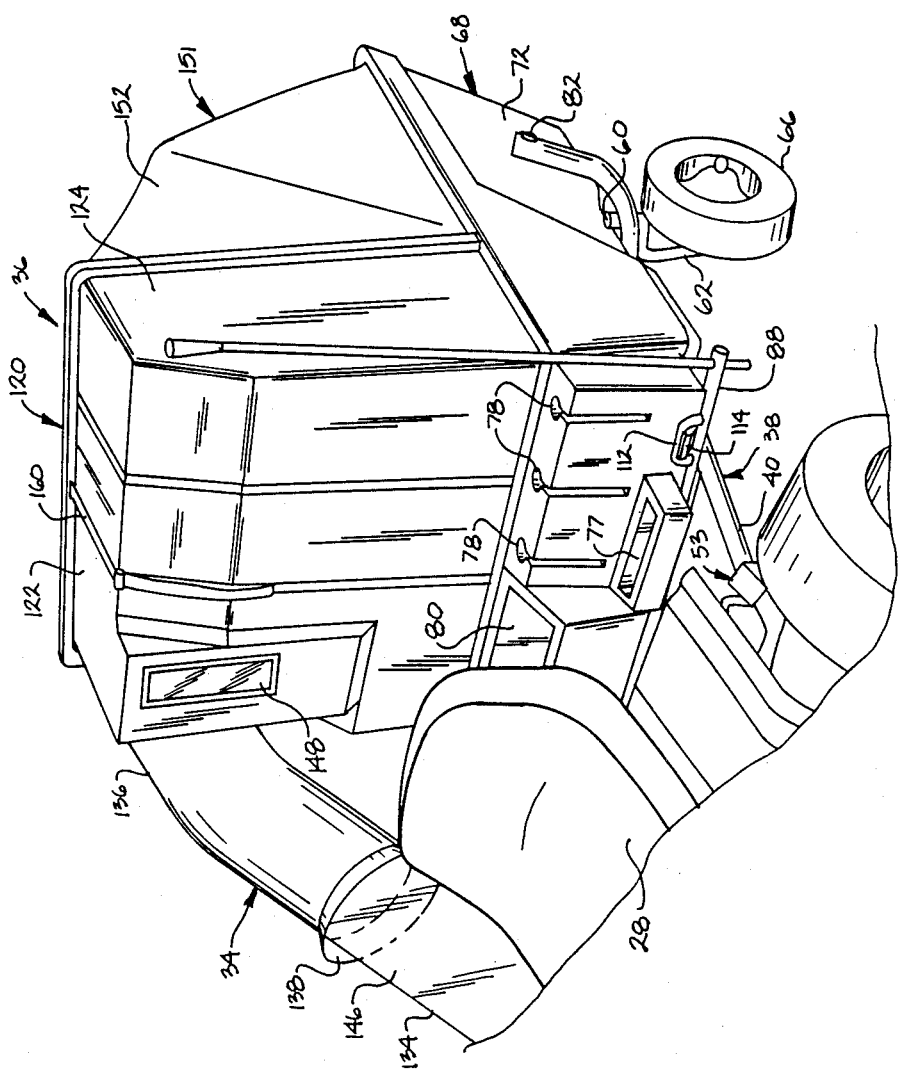
FIG. 3 is a perspective view of the cart shown in FIG. 1 taken from a different angle.

Referring now to the drawings, there is shown a somewhat conventional riding lawn mower 20 of the tractor-type having a rear pair of wheels 22 driven by an engine 24, a front pair of steerable wheels 26, an operator's seat 28 mounted substantially over the rear wheels adjacent the usual steering wheel 30 and other controls (not shown), a generally round open-bottomed blade housing 32 depending between the front and rear wheel pairs, and an upright engine-driven shaft (not shown) depending into the housing with the usual cutting blade (not shown) secured to the lower end thereof.

Connected to a discharge port (not shown) in the skirt of the blade housing 32 at one side of the mower 20 and extending upward and rearward is the usual discharge chute 34 into which grass clippings, leaves and other debris are blown by the action of the cutting blade.

Figure 4:
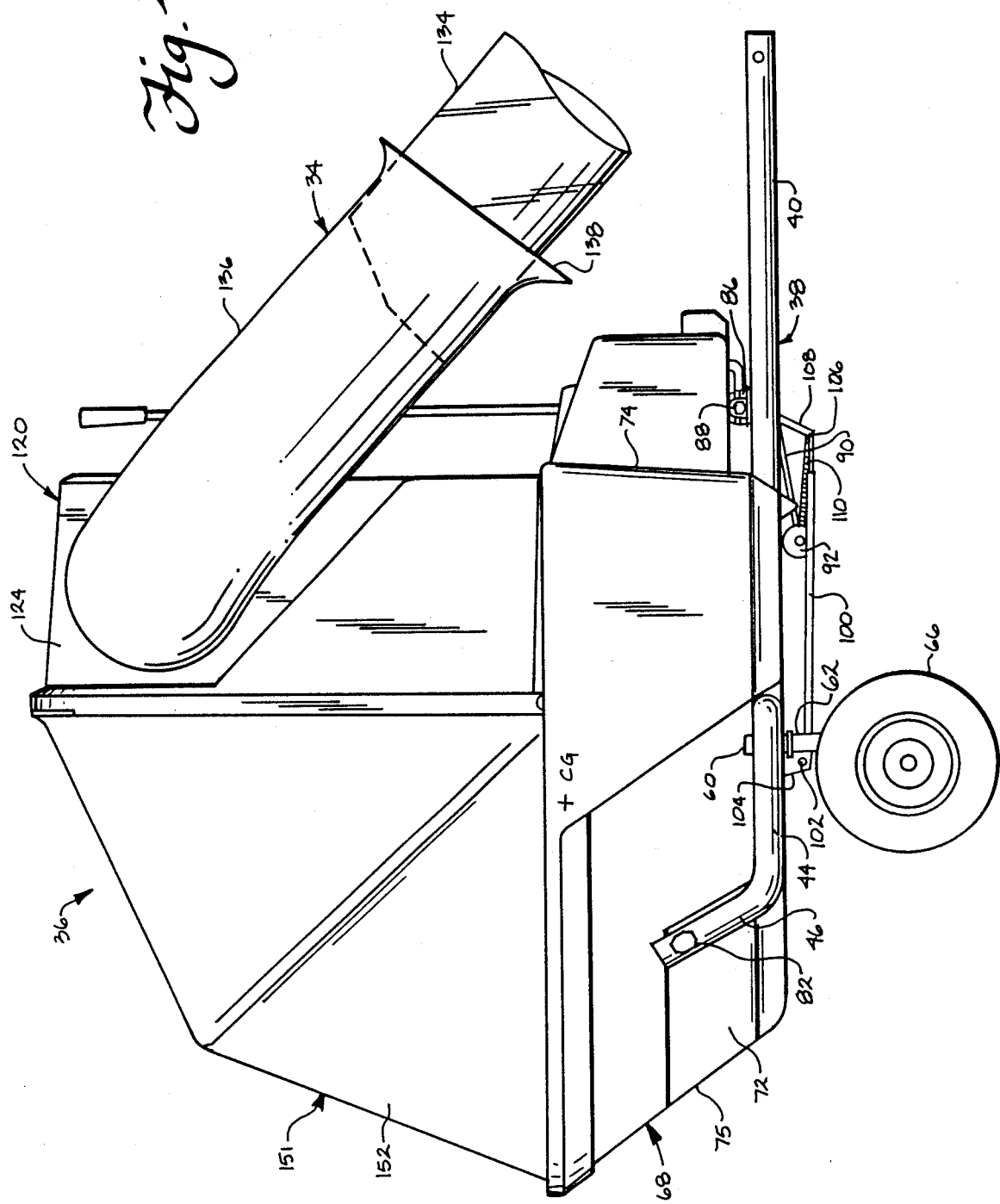
FIG. 4 is a left side view of the cart shown in FIG. 1.
Figure 5:
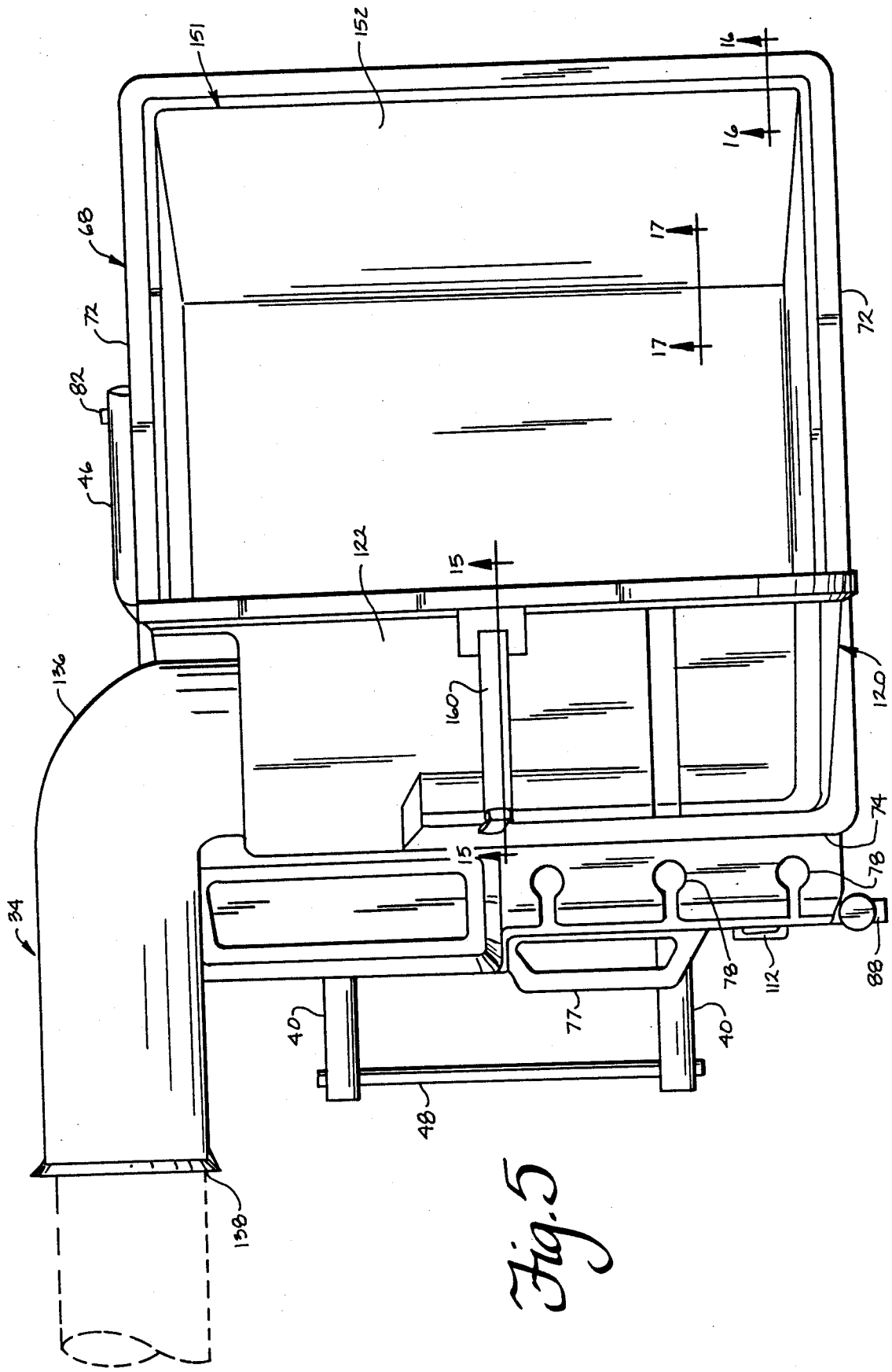
FIG. 5 is a top view of the cart shown in FIG. 1.
Figure 10:
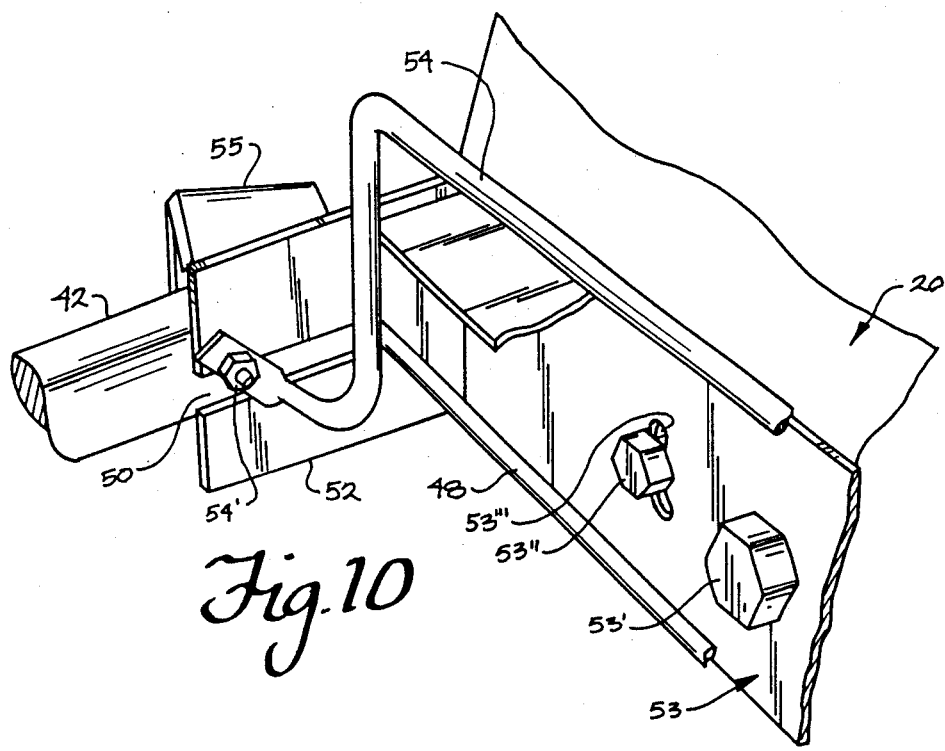
FIG. 10 is an enlarged fragmentary perspective view showing details of the cart-mower hitch.

Detachably hitched to the rear of the mower 20, to be towed thereby, is a cart 36 embodying this invention. The cart 36 has a chassis or frame 38 preferably made of lightweight but sturdy tubular sections which include two side sections 40 having forward horizontal parallel portions 42 that merge into two rearward horizontal diverging portions 44 that in turn merge into two generally parallel upward inclined rear portions 46 as best shown in FIGS. 4 and 8. The forward ends of the forward portions 42 are connected by a cross piece or transverse rod 48 which fits into rearward-opening notches 50 having rounded bottoms in two vertical flanges 52 of a hitch bracket 53 bolted to the rear end of the mower 20, as shown best in FIGS. 10 and 11. The flanges 52 are spaced apart a distance slightly less than that between the frame forward portions 42. The rod 48 is detachably locked in the notches 50 by a manually operable bale 54, having the bent ends thereof pivotally fastened to the flanges 52 by bolts and nuts 54'. It will be seen, however, that when locked in the notches 50 the rod 48 can pivot therein about a horizontal axis so that the cart 36 can pivot relative to the mower 20 about such axis to follow the contours of the ground, i.e. in changing from the horizontal in the direction of travel, but the lateral spacing of the flanges 52 prevents pivotal movement of the cart relative to the mower about a vertical axis.

The bracket 53 is secured to the mower 20 on a central horizontal bolt 53' extending in the fore and aft direction and which allows the bracket to pivot about a fore and aft axis although the pivoting is limited to about a 20° arc by studs 53" secured to the mower and extending through arcuate slots 53" in the bracket. Such limited pivoting prevents traction problems, i.e. possible lifting of one of the driving wheels 22 of the mower 20 by movement of the cart 36. The limited pivoting also reduces stress, thus enabling the chassis 38 to be of lighter weight design.

The forward end of each frame side section 40 is housed between upper and lower flanges 55 on the bracket 53 which extend laterally outward from each flange 52 and diverge somewhat rearward. By engagement with the frame portions 42, as shown in dotted lines in FIG. 11, the flanges 55 limit the above-described up and down pivotal movement of the cart 36 relative to the mower 20. Such limitation prevents disconnection of the chute system for transferring grass clippings, etc. from the mower to the cart, as described later in detail, when travelling over a hump on the ground and compression damage to the chute system when travelling over a narrow valley.

The frame side sections 40 are also connected by the two additional cross-pieces, one 56 about midway of the length of the forward portions 42 and another 58 at about the rear ends of the diverging portions 44, as best shown in FIG. 8. Substantially at each connection of the cross-piece 58 with the side sections 40 is a bearing 60 supporting a depending spindle or yoke 62 for rotation about a vertical axis. The spindle 62 is inclined from the vertical axis and at its lower end is formed with a stub axle 64 for a castor wheel 66.

It will be seen that the cart 36 is rather closely coupled to the mower 20 so as not to unduly interfere with the operation of the latter. Also, it will be seen that the hitching arrangement and the castor wheels 66 enable the mower-cart combination to be backed and turned with no possibility of "fish-tailing", i.e. the cart 36 to become uncontrollably misaligned with the direction of rearward movement of the mower 20.

Mounted to the chassis 38 is a tub-like bed 68 generally rectangular in plan view having a bottom 70, upstanding side walls 72 and front and rear end walls 74 and 75 with the rear end wall 75 inclined upward and rearward to facilitate dumping of the contents of the cart 36 as described later in detail. Preferably the bed 68 is made of one-piece lightweight molded or cast plastic material, such as polyethylene, and of double wall construction for added strength. The underside of the bed 36 preferably is provided with recesses, as at 76 (FIGS. 8 and 9), complementary to and to accommodate horizontal portions of the frame side sections 40 and the cross-piece 58 while the bed is resting thereon in a generally horizontal position for loading the cart 36. At its forward end the bed 68 preferably is provided a handhold 77, for reasons later explained, and also with a rack-like arrangement, e.g. sockets 78, for carrying garden tools by their handles, such as a rake, a hoe and a broom, and a receptacle 80, e.g. for trowels and other gardening implements.

The side walls 72 of the bed 68 are secured to the upper rearward ends of the frame side sections 40 by pivotal fasteners 82, e.g. pivot pins molded into the side walls, which enable the bed to tilt upward and rearward about a horizontal axis defined by the fasteners. That pivotal axis is so located with respect to the center of gravity, e.g. at CG (FIG. 4), of the bed 68, when loaded, that the bed normally will rest on portions of the frame forward of that axis in a stable loading position, as shown in FIGS. 1-4. When the bed 68 is tilted upward and rearward about that axis from that loading position, the center of gravity CG will pass rearward beyond the horizontal pivotal axis. As the center of gravity 84 does so pass, the bed 68 will become overbalanced and continue to tilt rearward by gravity to an inclined, substantially vertical dumping position, shown in FIG. 9, whereat the contents of the cart 36 will be dumped, i.e. slide by gravity over the rear wall 75 onto the ground or onto or into a collecting sheet of material or a vessel (not shown).

Figure 6:
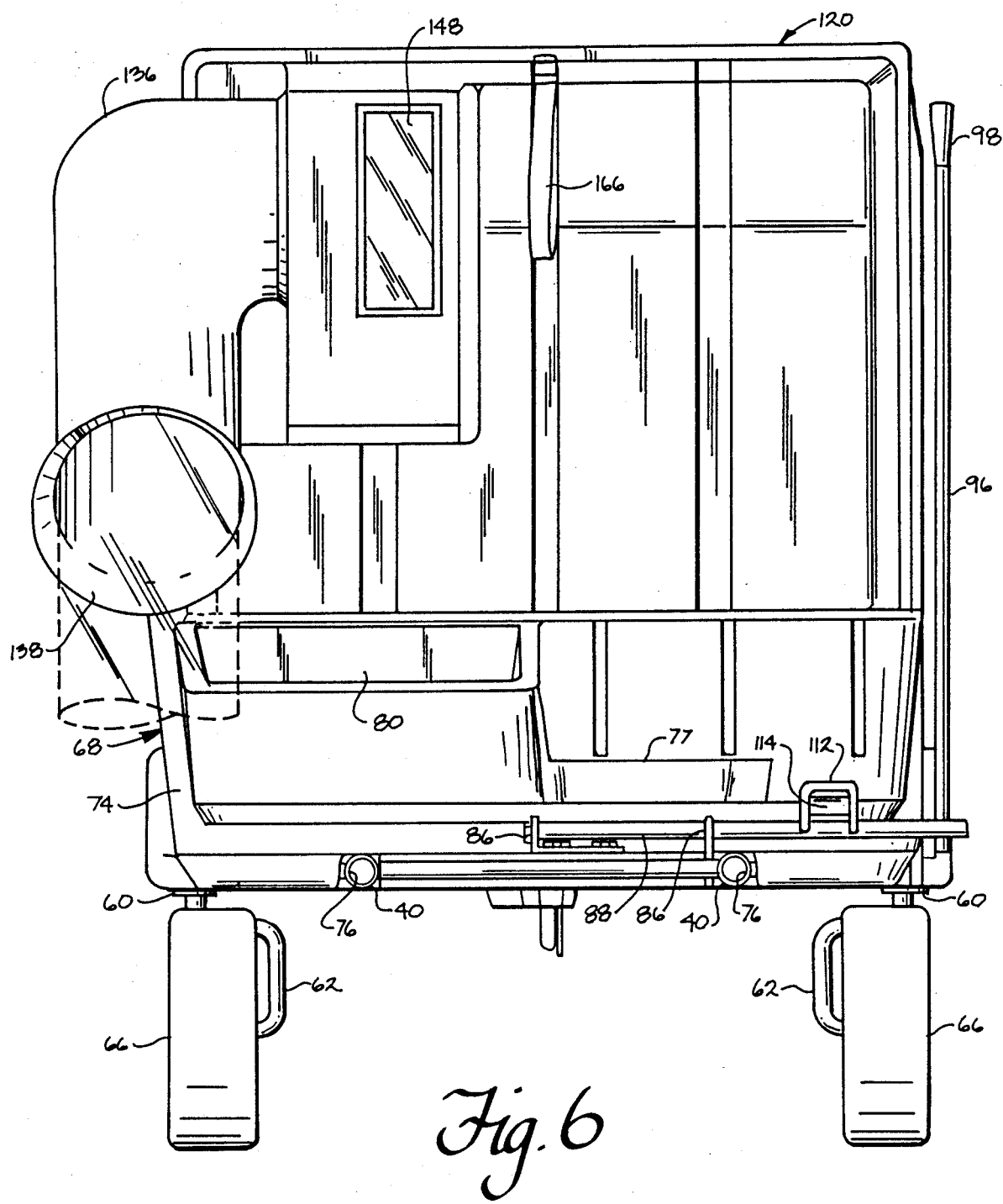
FIG. 6 is a front view of the cart shown in FIG. 1.
Figure 7:
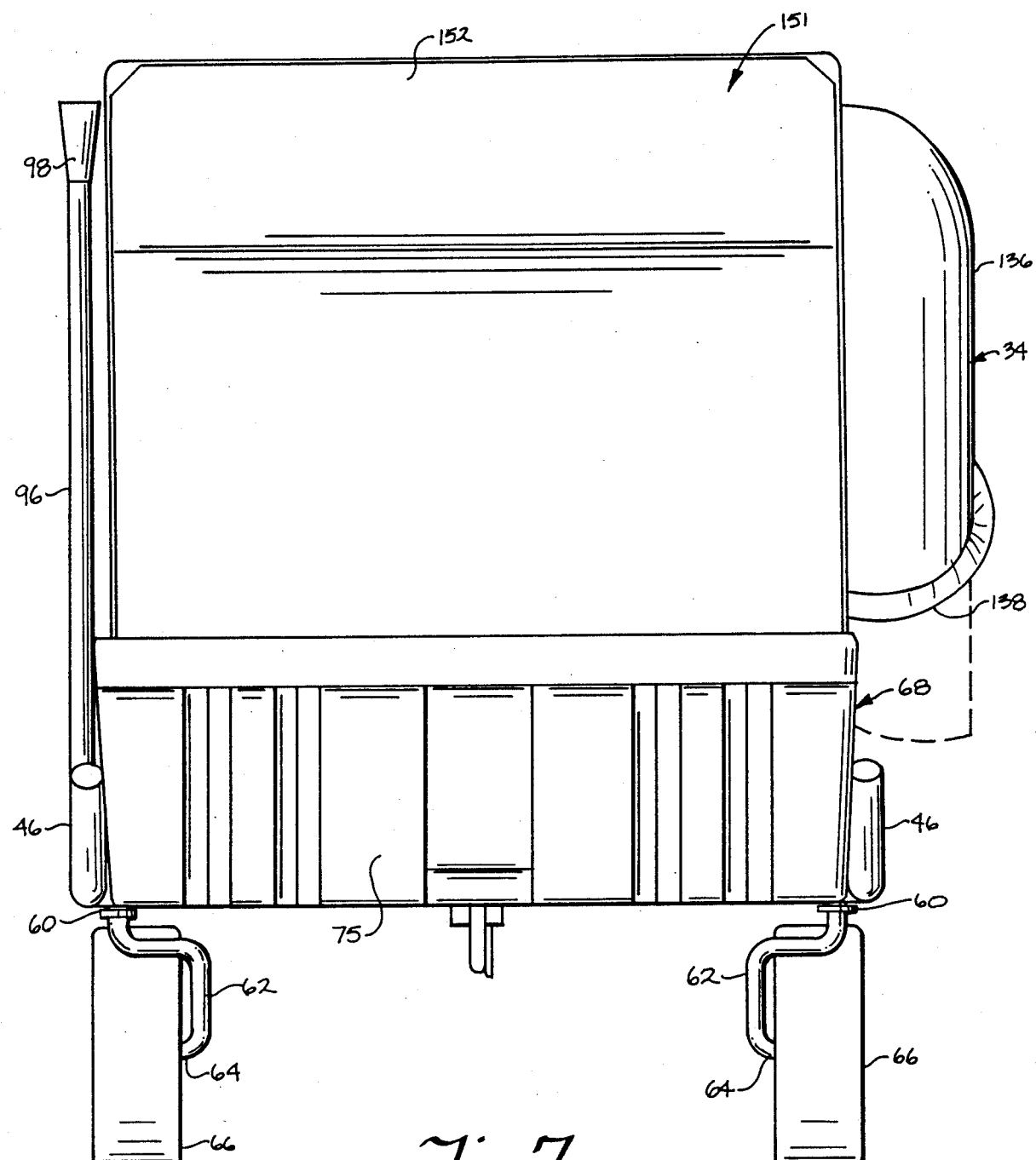
FIG. 7 is a rear view of the cart shown in FIG. 1.

Tilting of the bed 68 from its loading position to its overbalanced position may be accomplished by the mower operator without leaving the seat 28. As shown more clearly in FIGS. 4, 6 and 9, journalled in appropriate bearings 86 fastened on the upper side of the cross-piece 36 is a transverse shaft 88 projecting laterally slightly beyond one side of the bed 68. Secured to and extending radially from the shaft 88 underneath a front portion of the bed 68 is a lever 90 having a cam follower roller 92 on its free end for riding on a curved cam surface 94 on the undersurface of the bed. A lever 96 attached to the laterally projecting end of the shaft 88 extends upward with its upper end having a handle 98 accessible to a mower operator while seated on the seat 28. A forward pull on the handle 98 by the operator lifts the roller lever 90 and causes the bed 68 by the camming action of the roller 92 to tilt rearward to its overbalanced position from whence it will continue to tilt by gravity to its dumping position.

That continuing rearward tilt from an overbalanced position may become abrupt or sudden with possible damaging effects. To prevent such abrupt or sudden movement and to limit the tilting to the dumping position shown in FIG. 9, a gas-filled extensible shock absorber 100 is pivotally connected to and between the cross-piece 56 and the underside of the bed 68. One end of the shock absorber is pivotally connected by a pivot pin 102, to and between depending ears 104 on the underside of the bed 68 forward of the horizontal axis, while the other end of the shock absorber is pivotally connected to a stub pivot 106 formed on the lower end of a rod or bracket 108 secured to and depending from the cross-piece 56. Preferably a coiled tension spring 110 is connected to and between the end of that stub pivot 106 and the lever 90 adjacent the roller 92 to return the roller lever and the handled lever 96 to their normal positions after a dumping operation.

The bed 68 preferably is locked in its loading position by an operator-controlled latching arrangement to prevent possible tilting from that position occasioned by travel over rough ground. For this purpose, a U-shaped bracket 112 having its free ends secured to the shaft 88 has its legs bent of the bracket fits over a projection 114 on the front of the bed 68 when the latter is in its loading position and locks or latches the bed in that position. A forward pull on the handled lever 96 releases the bracket 112 from its locking engagement with the projection 114 just before the roller 92 starts to raise the front end of the bed 68 and tilt the latter rearward. Preferably the underside of the projection 114 is bevelled so that when it engages the bracket 112 in its movement back to loading position, it will cam the bracket forward, against the action of the spring 112, to ride over the projection and automatically return to locking or latching engagement therewith.

Extending along the inner side of the rear wall 75 and forward partly along the inner side of the side walls 72 of the bed 68, just below the tops of those walls, is a ledge 118 (FIGS. 16, 18). Short of the front wall, the ledge 118 drops to a position further below the top of the side walls 72, as shown in FIG. 18. Fitted into the front of the bed 68 is the lower portion of an upstanding wall 120 having rearward extending top and side flanges 122 and 124. The lower portion of the wall 120 and its side flanges 124 is stepped inward to provide a downward facing surface 125 that rests on the tops of the side and front walls 72 and 74 of the bed 68 while the bottoms of the side flanges 124 rest on the lower portions of the ledge 118, as shown in FIG. 18. Preferably, the wall 120 and the front wall 74 of the bed 68 are provided with complementary projections 126 and recesses 128 to detachably lock the wall 120 and its side flanges 124 to the bed. Preferably the wall 120 and the flanges 122 and 124 are made of one-piece molded or cast sturdy plastic material the same as that of the bed.

The discharge chute 34 is made in two sections, the lower section 134 having an elbow with the intake end thereof connected to the discharge port in the skirt of the blade housing 32. The chute upper section 136 also is provided with an elbow, the discharge end of which is connected to and opens through a round intake port 137 in the upper portion of the corresponding wall side flange 124. The connection between the lower and upper sections 124 and 126 is telescopic and that telescopic connection is arranged to be disconnected and reconnected by tilting movement of the bed 68 from loading to dumping position and back to loading position. To facilitate such reconnection, the outer of the telescoping sections has its connection end flared. In this instance, the upper section 126 is shown as having a flared mouth 138 to receive the upper end of the lower section 134. To further facilitate such reconnection, the discharge end of the lower section 134 is tapered as shown in FIG. 4.

Figure 13:
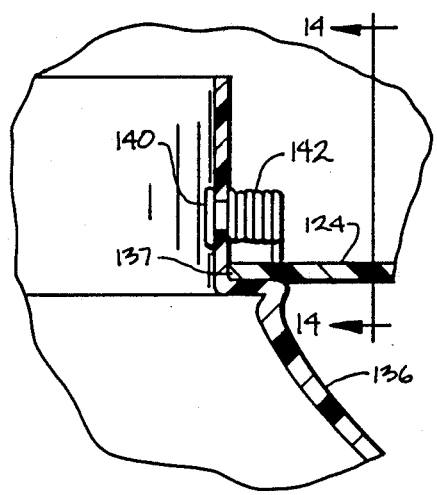
FIG. 13 is an enlarged fragmentary sectional view illustrating the arrangement for frictionally restraining pivotal movements of the discharge section of the chute relative to the cart.
Figure 14:
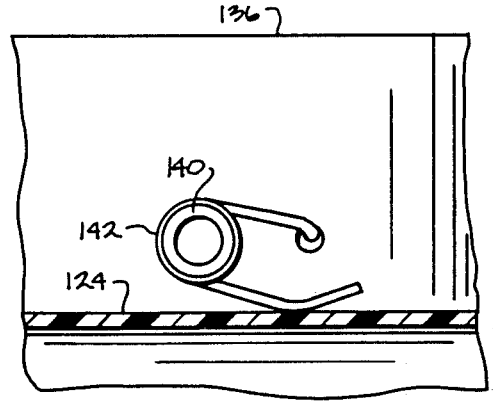
FIG. 14 is a fragmentary sectional view taken along line 14—14 of FIG. 13.
Figure 12:
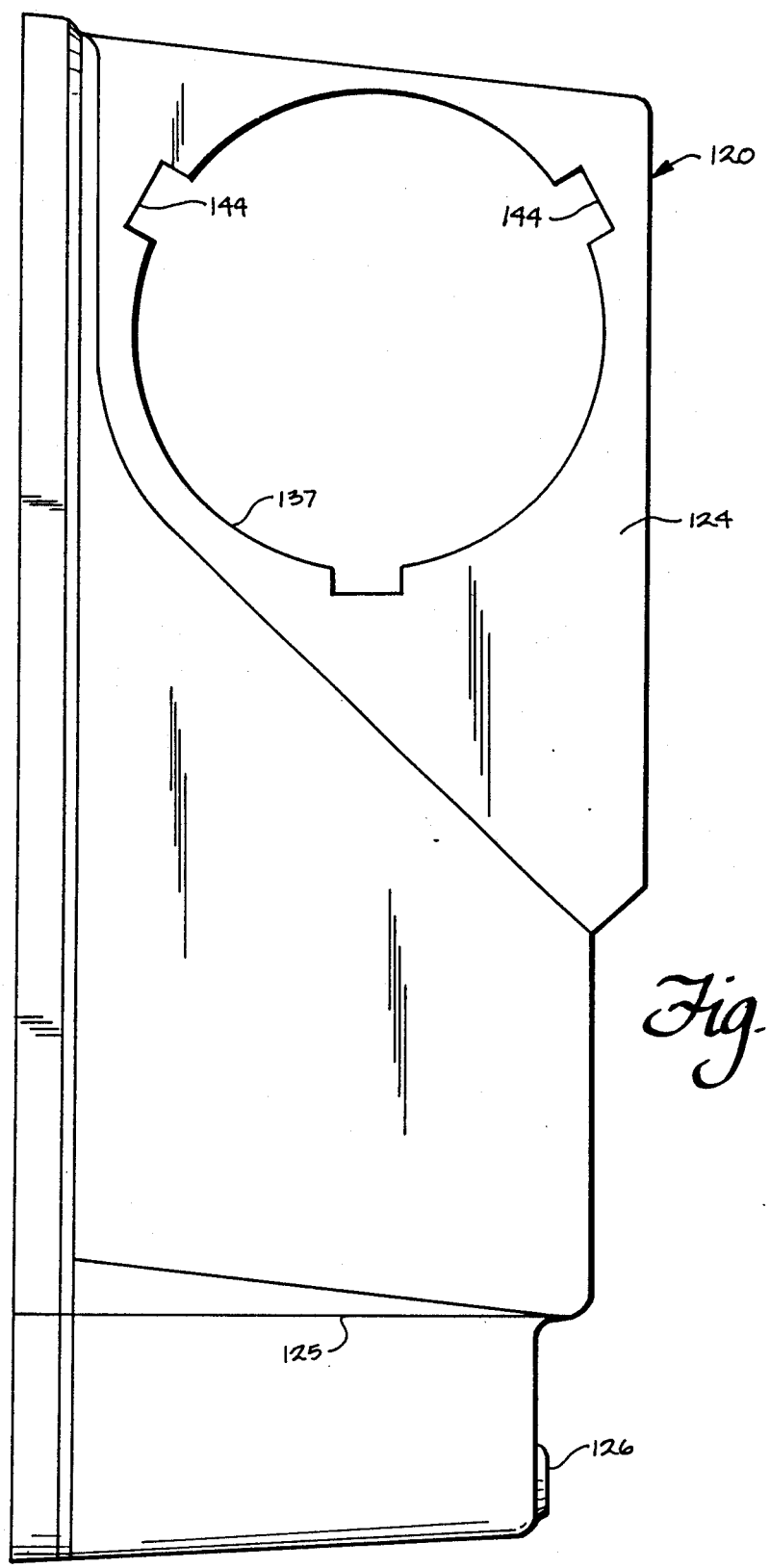
FIG. 12 is a right side view of the wall detachably secured to the front of the bed of the cart.

It will be seen that allowance must be made for some angular misalignment between the two sections 134 and 136 occasioned by up and down movements of the cart 36 relative to the mower 20 and tilting movements of the bed 68 between loading and dumping positions. Hence, one of the chute sections should be connected to the mower 20 or the bed 68 for pivotal swinging movement about a horizontal axis. As best seen in FIGS. 12-14, the upper section 136 projects snugly into the round intake port 137 to pivot therein. The angular position of the upper section 136 relative to the bed 68 may vary, however, at the time of disconnection from the lower section 134 depending on the position of the cart 38 relative to the mower 20. Such relative position should be maintained, however, to enable or facilitate reconnection of the chute sections. Hence, pivotal movement of the upper section 136 is frictionally restrained. For this purpose, studs 140, e.g. three, project radially at regular intervals from the discharge or inner end of the upper chute section 136 and each has wrapped thereabout a coil spring 142 one end of which is anchored in the section 136 and the other end of which bears frictionally against inner side of the wall side flange 124, thus restraining pivotal movement of the upper chute section, as shown in FIGS. 13 and 14. To permit ready assembly of the upper chute section 136, to the wall side flange 124, the rim of the intake port 137 is provided with notches 144 (FIG. 12) to enable insertion of the discharge end of the upper section 136 with the studs 140 and springs 142 thereon through the intake port and then pivot to a relative normal position where the springs bear against the side flange 124.

Preferably one of the chute sections, the lower section 134 illustrated here, is provided with a transparent portion 146 readily visible to the mower operator so that the operator can observe the passage of material through the chute 34. Still further, the wall 120 is provided with a vertically elongated transparent window 148 in an upper portion adjacent one side for convenient viewing by the mower operator to ascertain when the cart 36 is full of collected material.

Secured to the rear edges of the wall flanges 122 and 124 is a canopy 151 having a covering of air-pervious, flexible material 152, such as fabric. The free edges of the fabric 152 are secured to a bail 154 which rests on the interior ledge 118 just below the rim of the bed 68 and has its free ends pivotally secured, as at 156 to the lower rear marginal edge portions of the side flanges 124, all as shown best in FIG. 18. This canopy 151 covers the bed 68, enlarges its capacity and prevents escape of material collected in the bed. The canopy 151 also may include another bail 158 having its free ends pivotally supported on the same pivot as the bail 154. The bail 158 may be connected to the sheet material 152 at a position intermediate the top of the wall top flange 122 and the bail 154.

Before effecting a dumping operation, the canopy 151 is retracted by cord or by a strap 160 sliding in a groove 162 in the wall top flange 122 and extending through a slot 164 therein downward and rearward beneath the covering 152 over the top of the intermediate bail 158 and having its end secured to the lower bail 154. The end of the strap 160 extending forward out of the groove 102 may have its free end provided with a loop 166 which may be grasped by an operator to pull the strap and thus retract the canopy 151 substantially flush against the rear edges of the top and side flanges 122 and 124 of the wall 120 to thus uncover the bed 68 so that it can be dumped. Preferably a self-acting friction type lock, e.g. an eccentrically pivoted cam 168, spans the groove 102, as shown in FIG. 15, for a self-locking engagement with the strap 160 to retain the latter in its canopy-retracting position. The frictional lock may be readily reached and unlocked by a mower operator, however, as for pivoting the cam 168, to allow the canopy 151 to extend by gravity to its bed-covering position.

Preferably, the wall 120 and its flanges 122 and 124, together with the canopy 151 and the upper chute section 136, can be detached as a unit from the bed 68, by inward flexing of the lower portions of the side flanges 124, to allow the cart 36 to be used for utility purposes, i.e. to haul other materials, implements, or the like normally used in the garden and lawn maintenance activities.

The sequence of operation and movements of the bed 68 from loading to dumping positions and return are illustrated diagrammatically in FIG. 19 A-F which show that without leaving the seat 28 on the mower 20 an operator can:

(1) Grasp the strap loop 166 and pull the strap 100 to retract the canopy 151 which will be locked in that position by the friction lock 168.

(2) Pull the handled lever 96 to first release the bed lock 112, 114 and then contact the roller 92 with the under surface of the bed 68 and tilt it backward until its center of gravity, when loaded, passes rearward beyond the axis of the bed pivots 82 from whence the bed will continue to tilt backward to its dumping position while that continued movement is dampered and limited by the shock absorber 100. Meanwhile the handled lever 96 may be released, if desired, so that it, the roller 92 and the bracket 112 will return to their bed-locking positions by the force of the spring 110.

(3) Grasp the hand hold 77 on the bed 68 and tilt the bed back to loading position. During that movement the bevelled projection 110 will self-engage with the bracket 112 and lock the bed 65 in its loading position.

(4) Unlock the friction lock 168 for the strap 160 to allow the canopy 151 to descend by gravity to its bed-covered position.

It thus will be seen that the objects and advantages of this invention have been fully and effectively achieved. It will be realized, however, that the foregoing specific embodiments has been disclosed only for the purpose of illustrating the principles of this invention and is susceptible of modification without departing from such principles. Accordingly, the invention includes all embodiments encompassed within the spirit and scope of the following claims.

We claim:

1. A cart assembly for receiving and collecting grass clippings, leaves and other debris harvested from the ground and discharged by a riding rotary lawn mower or the like to the rear of which said assembly is hitched, comprising:
   a chassis having two ground-engaging wheels attached thereto at opposite sides thereof and means at the front end of said chassis for hitching said assembly to a mower or the like;
   an open top tub-like bed carried by said chassis;
   means mounting said bed to said chassis for rearward tilting about a horizontal transverse axis from a generally horizontal stable loading position to a rearwardly inclined dumping position, said axis being so positioned relative to the center of gravity of said tub when loaded that when said bed is tilted sufficiently rearward said bed will overbalance, move by gravity to said dumping position and dump the contents thereof; and
   means for automatically latching said bed to said chassis in said loading position;
   operator-controlled means accessible to a mower operator while seated on the mower for unlatching said bed from said chassis in said loading position and for tilting said bed to the overbalance position.

2. The cart assembly defined by claim 1 wherein the up-tilted front end of the bed when in the dumping position is accessible to a mower operator while seated on the mower for tilting said bed forward back to the loading position.

3. The cart assembly defined by claim 1 wherein the operator-controlled means includes a lever having one end thereof pivotably mounted to the chassis and the other end thereof extending beneath the bed to engage an undersurface thereof forward of the tilting axis thereof and camingly tilt said bed to the overbalance position on pivotal movement of said lever in a direction to engage said other end thereof with said undersurface and handle means effectively attached to said one lever end.

4. The cart assembly defined by claim 3 including spring means engaged between the chassis and the lever to urge the latter to pivot in the opposite direction.

5. The cart assembly defined by claim 4 in which the automatic latching means includes latching members one on the bed forward of the tilting axis thereof and the other on a rotatable rod comprising the pivotal axis of the lever.

6. The cart assembly defined in claim 3 in which the automatic latching means includes interengageable latch members one on the bed forward of the tilting axis hereof and the other on a rod rotatably mounted to the chassis and included in the operator controlled means and spring means for rotating said rod in a direction to engage said latch members when said bed is in the loading position.

7. A cart assembly for receiving and collecting grass clippings, leaves and other debris harvested from the ground and discharged by a riding rotary lawn mower or the like to the rear of which said assembly is hitched, comprising:
   a chassis having two ground-engaging wheels attached thereto at opposite sides thereof and means at the front end of said chassis for hitching said assembly to a mower or the like;
   an open top tub-like bed carried by said chassis;
   means mounting said bed to said chassis for rearward tilting about a horizontal transverse axis from a generally horizontal loading position to a rearwardly inclined dumping position;
   rigid wall means extending upward from the front end and forward side portions of said bed;
   first chute section means having the discharge end thereof connected to one of said side portions of said wall means for conducting to said bed material harvested by the mower, said first chute section means extending forward and downward from the discharge end thereof for telescoping connection of the intake end thereof with the discharge end of second chute section means having the intake end thereof connected to the mower, said connection being disconnectable by the rearward tilting of said bed from said loading position to said dumping position and automatically reconnectable by forward tilting of said bed from said dumping position back to said loading position, one of said intake end of said first chute section means and said discharge end of said second chute section means being flared to facilitate the reconnection of the connection.

8. The cart assembly defined by claim 7 including means connecting the first chute section means to the wall means for up and down swinging movements of the intake end of said first chute section means about a horizontal axis under frictional restraint so as to restrain said first chute section means against such movement when disconnected from the second chute section means and to retain said first chute section in position for the automatic reconnection.

9. The cart assembly defined by claim 7 including canopy means attached to the wall means and engaged with the rim of the bed for covering the latter and expanding the capacity of said assembly while containing the contents thereof.

10. The cart assembly defined by claim 9 including means accessible to a mower-operator while seated on the mower for retracting the canopy means against the wall means to uncover the bed for a dumping operation.

11. The cart assembly defined by claim 10 wherein the canopy means includes:
    flexible air-pervious, sheet-like means;
    a bail for said sheet-like means engageable with the rim and having the ends thereof pivotally connected to the wall means adjacent the lower side edges thereof; and
    the retracting means includes cord-like means connected to said bail and extending over the top and to the front of the wall means.

12. The cart assembly defined by claim 9 including means attachably fastening the wall means and the canopy means to the bed.

13. The cart assembly defined by claim 7 wherein the hitching means permits pivotal movement of the assembly relative to the mower about a substantially horizontally transverse axis and includes means limiting said pivotal movement to prevent disconnection of the first and second chute section means and possible compression damage thereto when the bed is in the loading position and said assembly is traveling over uneven ground.

14. A cart assembly for receiving and collecting grass clippings, leaves and other debris harvested from the ground and discharged by a riding rotary lawn mower or the like to the rear of which said assembly is hitched, comprising:
    a chassis having two ground-engaging castor wheels attached thereto at opposite sides thereof;
    means at the forward end of said chassis for hitching said assembly to a mower or the like for limited pivotal movement of said assembly relative to the mower about a substantially horizontal transverse axis, against pivotal movement about a substantially vertical axis and for limited pivotal movement about a fore and aft substantially horizontal axis;
    an open top tub-like bed carried by said chassis; and
    means mounting said bed to said chassis for rearward tilting about a horizontal transverse axis from a generally horizontal loading position to a rearwardly inclined dumping position.

15. The apparatus defined in claim 14 wherein the axis of the bed is so positioned relative to the center of gravity thereof when loaded that when said bed is tilted sufficiently rearward said bed will overbalance, move by gravity to said dumping position and dump the contents thereof.

16. Apparatus for cutting grass and collecting grass clippings and other debris comprising;
    a riding lawn mower having an operator's seat and a blade housing with a rotary blade therein for cutting grass, said housing having a discharge port for discharging grass clippings and other debris outwardly of said housing;
    a part assembly detachably hitched to the rear of said mower for receiving and collecting grass clippings and other debris discharged from said port, said assembly comprising:
    a chassis having two ground-engaging wheels attached thereto at opposite sides thereof;
    an open top tub-like bed carried by said chassis;
    means mounting said bed to said chassis for rearward tilting about a horizontal transverse axis from a generally horizontal stable loading position to a rearwardly inclined dumping position, said axis being so positioned relative to the center of gravity of said tub when loaded that when said bed is tilted sufficiently rearward, said bed will overbalance, move by gravity to said dumping position and dump the contents thereof; and
    means for automatically latching said bed to said chassis in said loading position;
    operator-controlled means accessible to an operator while seated on said seat for unlatching said bed from said chassis in said loading position and for tilting said bed to said overbalance position.

17. The apparatus defined by claim 16 wherein the front end of the bed when in the dumping position is accessible to an operator while seated on said seat for tilting said bed back to the loading position.

18. Apparatus for cutting grass and collecting grass clippings and other debris comprising:
    a riding lawn mower having an operator'seat and a blade housing with a rotary blade therein for cutting grass, said housing having a discharge port for discharging grass clippings and other debris outwardly of said housing;
    a cart assembly detachably hitched to the rear of said mower for receiving and collecting grass clippings and other debris discharged from said port, said assembly comprising:
    a chassis having two ground-engaging wheels attached thereto at opposite sides thereof;
    an open top tub-like bed carried by said chassis;
    means mounting said bed to said chassis for rearward tilting about a horizontal transverse axis from a general horizontal loading position to a rearwardly inclined dumping position;
    first chute section means having the discharge end thereof secured to said bed for conducting thereto material discharged from said blade housing port and extending from said discharge end forward and downward to an intake end; and
    second chute section means having the intake end thereof secured to said blade housing about said port and extending therefrom rearward and upward to a discharge end in telescoping connection with said intake end of said first chute section means, said connection being disconnectable by the rearward tilting of said bed from said loading position to said dumping position and automatically reconnectable by tilting of said bed from said dumping position back to said loading position.

19. The apparatus defined in claim 18 including means connecting the first chute section means to the bed for up and down swinging movements of the intake end of said first chute section means about a transverse horizontal axis under frictional restraint so as to restrain such movement when disconnected from the second chute section means and retain said first chute section means in position for the automatic reconnection.

20. The apparatus defined by claim 18 wherein the bed has a rim and including rigid wall means extending upward from the front end and forward side portions of said bed, the discharge end of said first chute section means being connected to one of said side portions of said wall means; and
    canopy means attached to said wall means and engaged with said rim of said bed for covering the latter and expanding the capacity of said assembly while containing the contents thereof.

21. The apparatus defined by claim 20 including means accessible to an operator while seated on the seat for retracting the canopy means to uncover the bed for a dumping operation.

22. The apparatus defined by claim 21 wherein the canopy means includes:
    flexible air-pervious, sheet-like means;
    a bail for said sheet-like means engageable with the rim and having the ends thereof pivotally connected to the wall means adjacent the lower side edges of the wall means; and
    the retracting means includes cord-like means connected to said bail and extending to the front of said wall means.

23. The apparatus defined by claim 22 including self-acting friction type lock means mounted to the top of the wall means for retaining the cord-like means in canopy-retracting position.

24. The apparatus defined in claim 18 including means detachably hitching the cart assembly to the rear of the mower for limited pivotal movement of said cart assembly relative to said mower about a substantially horizontal transverse axis, against pivotal movement of said cart assembly relative to said mower about a substantially vertical axis and for limited pivotal movement of said cart assembly relative to said mower about a substantially horizontal fore and aft axis.

25. The apparatus defined by claim 18 including means for hitching the cart assembly to the mower for pivotal movement of said assembly relative to said mower about a substantially horizontal transverse axis and means limiting said movement to prevent disconnection of the first and second chute section means and possible compression damage thereto when the bed is in loading position and said apparatus is traveling over uneven ground.

26. Apparatus for cutting grass and collecting grass clippings and other debris comprising:
    a riding lawn mower having an operator's seat and a blade housing with a rotary blade therein for cutting grass, said housing having a discharge port for discharging grass clippings and other debris outwardly of said housing;
    a cart assembly detachably hitched to the rear of said mower for receiving and collecting grass clippings and other debris discharged from said port, said assembly comprising:
    a chassis having two ground-engaging castor wheels attached thereto at opposite sides thereof;
    an open top tub-like bed carried by said chassis;
    means mounting said bed to said chassis for rearward tilting about a horizontal transverse axis from a generally horizontal loading position to an inclined dumping position;
    means for automatically latching said bed to said chassis in said loading position;
    operator-controlled means accessible to an operator while seated on said seat from unlatching said bed from said chassis in said loading position and for tilting said bed to said dumping position; and
    means detachably hitching said cart assembly to the rear of said mower for pivotal movement of said cart assembly relative to said mower about a substantially horizontal transverse axis against such pivotal movement about a substantially vertical axis and for limited such pivotal movement about a fore and aft substantially horizontal axis.

27. A cart assembly for receiving and collecting grass clippings, leaves and other debris harvested from the ground and discharged by a riding rotary lawn mower or the like to the rear of which said assumably is hitched, comprising:
    a chassis having two ground-engaging wheels attached thereto at opposite sides thereof and means at the front end of said chassis for hitching said assembly to a mower or the like;
    an open top tub-like bed carried by said chassis;
    mean mounting said bed to said chassis for rearward tilting about a horizontal transverse axis from a generally horizontal loading position to a rearwardly inclined dumping position;
    rigid wall means extending upward from the front end and forward side portions of said bed;
    canopy means attached to said wall means and engaged with the rim of said bed for covering the latter and expanding the capacity of said assembly while containing the contents thereof;
    chute means connected to an aperture in said wall means for conducting to said bed material harvested by the mower; and
    interengaging means on said bed and said wall means for detachably fastening said wall means and canopy means to said bed, the lower side portions of said wall means being somewhat elastic and inwardly flexible for detaching said wall means and said canopy means from said bed.

* * * * *